United States Patent [19]

Hoppe

[11] Patent Number: 4,889,627

[45] Date of Patent: Dec. 26, 1989

[54] PUSHER CENTRIFUGE

[75] Inventor: Bernd Hoppe, Weinigen, Switzerland

[73] Assignee: Sulzer-Escher Wyss Ag, Zürich, Switzerland

[21] Appl. No.: 314,195

[22] Filed: Feb. 23, 1989

[30] Foreign Application Priority Data

Mar. 7, 1988 [CH] Switzerland ........................ 00834/88

[51] Int. Cl.⁴ ................................................ B01D 33/10

[52] U.S. Cl. .................................. 210/360.2; 210/367; 210/374; 210/376

[58] Field of Search ............ 55/337; 210/360.1, 360.2, 210/372, 374, 376, 384, 367

[56] References Cited

U.S. PATENT DOCUMENTS 4,209,405 6/1980 Christ .................................. 210/376
4,217,226 8/1980 Kämpeen et al. ................... 210/376

FOREIGN PATENT DOCUMENTS 1065333 9/1959 Fed. Rep. of Germany .
1295577 5/1962 France .

*Primary Examiner*—Charles Hart
*Attorney, Agent, or Firm*—Werner W. Kleeman

[57] ABSTRACT

In a pusher centrifuge comprising substantially cylindrical sieve or straining drums which simultaneously rotate but also oscillate relative to one another, and a pusher bottom or base, the pusher edge of at least one sieve or straining drum is provided with inclined surfaces which impart in the transverse or circumferential direction a motive component to the centrifuging or solid material transported in the axial direction. By virtue of the thus generated shearing effect, the compacted solid material cake is torn open or disintegrated during the forward feed and the dewatering performance is improved.

10 Claims, 1 Drawing Sheet

FIG. 1.
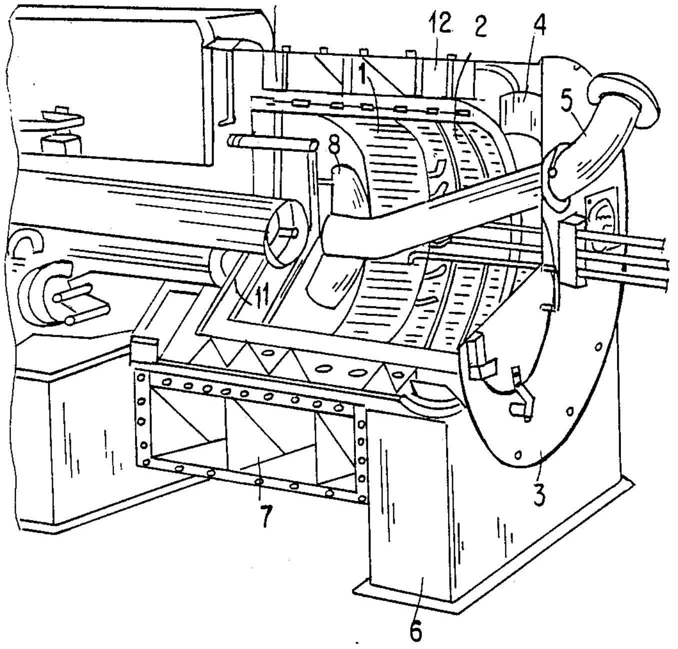
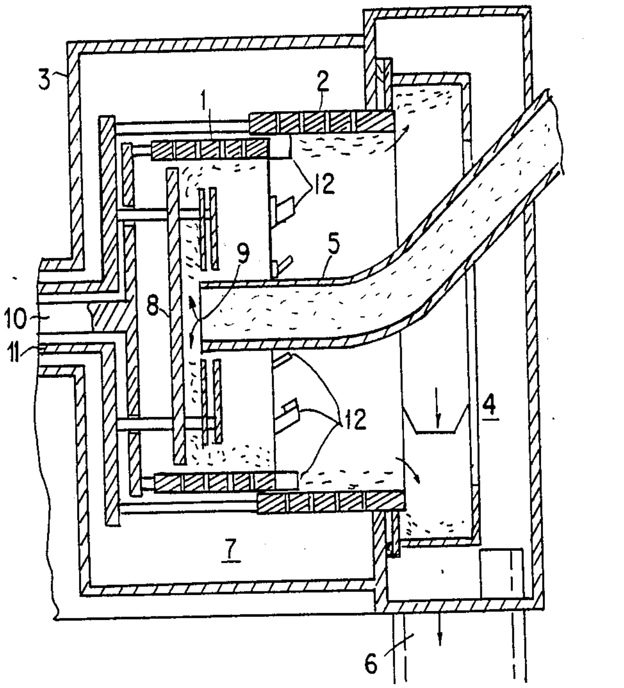
FIG. 2.
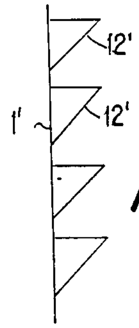
FIG. 3a.
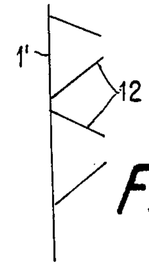
FIG. 3b.
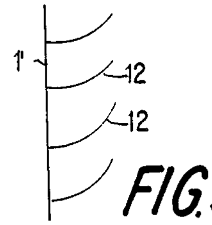
FIG. 3c.
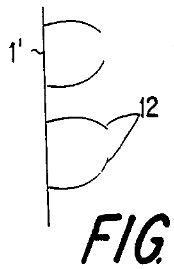
FIG. 3d.

PUSHER CENTRIFUGE

BACKGROUND OF THE INVENTION

The present invention broadly relates to centrifuges and, more specifically pertains to a new and improved construction of a pusher centrifuge.

Generally speaking, the pusher centrifuge of the present invention comprises a housing, at least one at least approximately cylindrical sieve drum which is rotatable in the housing and has an inner space into which material to be centrifuged can be fed in at one end of the at least one sieve drum, and at least one co-rotating pusher ring which is constructed to perform an oscillating motion in the axial direction of the at least one sieve drum while transporting the at least partially dewatered centrifuging or solid material at the inner side of the at least one sieve drum in the direction toward a solid material outlet provided at the other end of the at least one sieve drum.

Such pusher centrifuges are known, for example, from U.S. Pat. No. 4,217,226, granted Aug. 12, 1980 and U.S. Pat. No. 4,209,405, granted June 24, 1980, and serve to continuously dewater a centrifuging material which is fed into the inner end of a centrifuging or free flow space by means of a feed pipe and successively dewatered at the inner side of the sieve or centrifuge drums. During this operation, the centrifuging material is gradually transported or conveyed in the direction toward a solid material outlet by means of the oscillating motion of one or several pusher rings, of which the innermost pusher ring is constructed as the pusher bottom or base, and simultaneously not yet dewatered material to be centrifuged is filled in close to the first pusher ring. Such a pusher centrifuge can comprise several sieve or centrifuge drums whereby always two neighboring or adjacent sieve or centrifuge drums oscillate relative to one another in the axial direction and the edge or edge portion of the respective inner sieve or centrifuge drum acts or functions as the pusher ring. In a one-stage centrifuge the pusher bottom or base, for example, can oscillate, while in a two-stage centrifuge the oscillating member can be, for example, the sieve or centrifuge drum. In a three-stage centrifuge the pusher bottom or base and the second sieve or centrifuge drum, for example, can oscillate, while in a four-stage centrifuge the oscillating members can be, for example, the first sieve or centrifuge drum and the third sieve or centrifuge drum.

With a pusher centrifuge of this known type, a continuous dewatering of a centrifuging material is possible in that the centrifuging material in the course of transport at the inner side of the sieve or centrifuge drums from the centrifuging material inlet up to the solid material outlet is gradually dewatered in the centrifugal space or area and reaches the solid material outlet in a substantially dewatered condition, while the filtrate or filtered matter or material outwardly penetrates the sieve or centrifuge drums and is there removed or drained off.

However, in these prior art pusher centrifuges, the rate of dewatering or the residual moisture of the removed or discharged solid material is still not at an optimum. An improvement could be achieved either by extending the dewatering time, with the result that the throughput of centrifuging material is reduced, or by raising the speed of the pusher centrifuge, although this measure is only limitedly possible because of abrasion occurring and for reasons of rigidity or stability, and such measure makes the solid material cake even compacter and thus even more impervious.

On the other hand, pusher centrifuges are known from, for example, West German Pat. No. 1,065,333, published Sept. 10, 1959, or French Pat. No. 1,295,577, granted May 2, 1962, wherein the pusher bottom or base is inclined or possesses inclined surfaces and rotates with different speeds in comparison with the sieve drum. The result of this design is a complicated construction and an additional gearing or gear unit is required. Furthermore, a loosening and circulation of the centrifuging material can only be achieved directly at the inlet, while the filter cake on or at the sieve drum is moved forward as a relatively compact and increasingly impervious mass.

SUMMARY OF THE INVENTION

Therefore with the foregoing in mind it is a primary object of the present invention to provide a new and improved pusher centrifuge which does not suffer from the aforementioned drawbacks and shortcomings of the prior art constructions.

Another and more specific object of the present invention aims at providing a new and improved pusher centrifuge which increases the rate of dewatering of a pusher centrifuge of the aforementioned type and decreases the residual moisture of the discharged solid material without changing or modifying the operational parameters of the centrifuge and without a more complicated or complex construction or design.

Now in order to implement these and still further objects of the invention, which will become more readily apparent as the description proceeds, the pusher centrifuge as contemplated by the present invention, among other things, is manifested by the features that surface elements are provided at an outer edge or edge portion of the at least one co-rotating pusher ring, such surface elements being oriented in inclined relationship to the rotational axis of the at least one at least approximately cylindrical sieve drum and such surface elements imparting to the centrifuging material during the oscillating motion an additional motive component in a predetermined circumferential direction of the at least one sieve drum.

It is especially advantageous to provide the outer edge or edge portion of at least one inner sieve drum with such inclined surface elements, this inner sieve drum being capable of oscillation relative to an outer sieve drum. The surface elements can thereby be provided at the edge or edge portion of an oscillating sieve drum, or else at the edge or edge portion of a non-oscillating sieve drum, the lateral movement or shearing effect being produced by the following oscillating sieve drum.

It is advantageous to also provide the outer edge or edge portion of a pusher bottom or base with inclined surface elements, such pusher bottom or base oscillating within the innermost sieve drum and operating or acting as a pusher ring.

The surface elements can be plane or flat surfaces which form an angle of approximately between 30° and 60° with respect to the lengthwise or longitudinal axis of the sieve drum, or they can be curved or arched. Neighboring or adjacent surface elements at the circumference of the pusher ring can possess the same inclined orientation or can also be alternatingly inclined opposite to one another.

The invention takes advantage of the fact hitherto obviously not considered or not recognized in the construction of pusher centrifuges that, during every dewatering process in a centrifugal area or zone or field, a granulometrically dependent capillary layer is formed, which can be several millimeters thick and which influences the residual moisture of the material to be centrifuged. Owing to the fact that the inclined surface elements impart to the centrifuging material a transverse component in the circumferential direction in addition to the motive component in the axial direction, the lowest layer of the solid material cake is disintegrated by shearing action and released for further dewatering. The rate of dewatering of the material to be centrifuged along the transport path or passage from infeed or charge to outfeed or discharge can be thus increased without modification of the operating parameters of the centrifuge, or the quantity or through-put of dewatered centrifuging material can be increased for a predetermined required ultimate or final moisture, or the speed of the centrifuge can be lowered, thus reducing wear or abrasion.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein:

FIG. 1 shows a perspective view of a partially cut-open pusher centrifuge;

FIG. 2 shows the pusher centrifuge of FIG. 1 in a sectional view taken substantially along a sectional plane containing the axis of rotation;

FIG. 3*a* shows a first embodiment of pusher segments;

FIG. 3*b* shows a second embodiment of pusher segments;

FIG. 3*c* shows a third embodiment of pusher segments; and

FIG. 3*d* shows a fourth embodiment of pusher segments.

DETAILED DESCRIPTION OF THE PREFERRED EMBODIMENTS

Describing now the drawings, it is to be understood that to simplify the showing thereof, only enough of the construction of the exemplary embodiments of the inventive pusher centrifuge has been illustrated therein as is needed to enable one skilled in the art to readily understand the underlying principles and concepts of this invention. Turning now specifically to FIGS. 1 and 2 of the drawings, the pusher centrifuge illustrated therein by way of example and not limitation will be seen to comprise a centrifuging unit composed of two rotatable, approximately cylindrical sieve or straining drums 1 and 2, a stationary centrifuge housing 3 surrounding this centrifuge unit, and a solid material space or chamber 4 adjacent to the centrifuging unit at the outlet end thereof and containing a gaseous medium, for example, air. The pusher centrifuge also comprises a feed line or tube or pipe 5 for the centrifuging material to be dewatered. This feed line or tube 5 or equivalent structure opens with a centrifuging material inlet 9 at the inner end of the centrifuging unit close to a co-rotating pusher bottom or base 8. Furthermore, the pusher centrifuge comprises a solid material outlet 6 and a liquid chamber 7 for the liquid removed by centrifuging.

The inner sieve or straining drum 1 is mounted on a shaft or shaft member 10 by means of which the inner sieve or straining drum 1 can be set to rotate with a predetermined speed. The shaft 10 is simultaneously displaceable in axial direction and can perform, in addition to the rotation thereof, an oscillating motion by means of a not particularly illustrated driving gear or apparatus, such oscillating motion having a certain amplitude and extending in the axial direction. The outer sieve or straining drum 2 is fastened to a hollow shaft 11 by means of which the outer sieve or straining drum 2 can be set to rotate, however, without oscillating motion in axial direction. The speed of the two sieve or straining drums 1 and 2 is thereby usually identical.

The centrifuging material is passed through the inlet line or tube 5 into the interior of the innermost sieve or straining drum 1 directly adjoining the co-rotating pusher bottom or base 8 and flows there radially and outwardly onto the sieve or straining drum 1 where the dewatering process commences. Due to the oscillating sieve or straining drum 1, the partially dewatered centrifuging material is transported or conveyed in the direction toward the adjoining outer sieve or straining drum 2 and thereby further dewatered. In the meantime, further centrifuging material to be dewatered is continuously added and supplied through the feed line or tube 5. The outer edge or edge portion of the co-rotating pusher bottom or base 8 thus acts or operates as a first pusher ring. When the partially dewatered centrifuging material reaches the end of the inner sieve or straining drum 1, the centrifuging material is transported or conveyed by the edge or edge portion of the inner sieve or straining drum 1, which also acts or operates as a pusher ring, on to the outer sieve or centrifuge drum 2 and further dewatered at that location. Finally, the finished dewatered centrifuging material is transported or conveyed up to the solid material space or chamber 4 by means of the relative oscillation of the two sieve or straining drums 1 and 2, the dewatered centrifuging material leaving the solid material space or chamber 4 via the solid material outlet 6.

The hereinbefore described elements 1, 2 and 8 oscillating relative to one another in axial direction cause or bring about solely a motive component of the centrifuging material on to the inner surfaces of the sieve or straining drums 1 and 2 in axial direction. It has been surprisingly found that the dewatering capacity or performance is distinctly and remarkably improved when surface elements 12 are provided at the pusher ring located between the two sieve or straining drums 1 and 2, i.e. at the outer edge or edge portion of the inner sieve or straining drum 1. Such surface elements 12 comprise a pusher surface extending at an inclination to the axes of the sieve or straining drums 1 and 2 and thus to the axis of rotation. These pusher surfaces of the surface elements 12 are advantageously distributed across the entire pusher ring such that the pusher surfaces substantially sweep over the entire inner surface of the outer sieve or straining drum 2 but if possible do not overlap with one another. The inclination of the pusher surfaces 12 lies advantageously between 30° and 60° and could be, for example, 45°. By virtue of these pusher surfaces, it is possible that, upon oscillation of the two sieve or straining drums 1 and 2 relative to one another, the centrifuging material receives an additional motive component in circumferential direction. It is thus conceivable that the capillary layer, which is formed directly at the inner surface of the sieve or straining drum 2 under the action of the continuous forward feed impulses and which obstructs the through-passage of filtrate, is torn open or disintegrated by a shearing action and substantially eliminated, so that a larger quantity of filtrate can pass through and the dewatering performance is distinctly improved.

The invention has been hereinbefore described with reference to a pusher centrifuge containing two sieve or straining drums and additional pusher segments at the edge or edge portion of the inner sieve or straining drum. It is readily conceivable that the pusher segments constructed according to the invention can be provided with analogous advantage in pusher centrifuges having a different number of sieve or straining drums, for example, in pusher centrifuges containing more than two sieve or straining drums the inventive pusher segments can be arranged at the outer edges or edge portions of the inner sieve or straining drums. Pusher segments can also be arranged at the outer edge or edge portion of the pusher bottom or base.

Analogous advantages can also be achieved when the pusher segments are not structured as in the described exemplary embodiment as having plane or flat surfaces inclined at approximately 45° relative to the axis, but in any other suitable form or shape as shown by way of example in FIGS. 3*a*, 3*b*, 3*c* and 3*d*. The pusher surfaces can be plane or flat surfaces as depicted in FIGS. 3*a* and 3*b* or can possess a suitable curvature as depicted in FIGS. 3*c* and 3*d*. On the other hand, the pusher surfaces of the pusher ring can all be inclined in the same direction as shown in FIGS. 3*a* and 3*c*, or neighboring or adjacent pusher surfaces can alternatingly have an oppositely directed inclination as shown in FIGS. 3*b* and 3*d*.

Instead of inclined surfaces separately mounted at the pusher ring, the surface elements can also be formed by a suitable shaping of the pusher edge or edge portion of the respective sieve or straining drum. For example, the edge or edge portion 1' is shaped or structured by saw tooth-shaped notches 12' as shown in FIG. 3*a*. The notches can be milled or machined directly into the edge or edge portion of the sieve or straining drum, or can be formed by segments mounted at the edge or edge portion, for example, by screwed-on or threadably connected triangular segments. The latter embodiment has the advantage that in view of the unavoidable wear at the edge or edge portion the segments can be easily replaced and no reconditioning of an edge or edge portion will be required, so that the pusher centrifuge requires a minimum of maintenance and servicing and can be always run with optimum performance.

While there are shown and described present preferred embodiments of the invention, it is to be distinctly understood that the invention is not limited thereto, but may be otherwise variously embodied and practiced within the scope of the following claims. Accordingly,

What I claim is:

1. A pusher centrifuge, comprising:

a housing;

at least one at least approximately cylindrical sieve drum which is rotatable in said housing and has an inner space and an axis of rotation;

said at least one at least approximately cylindrical sieve drum having two end portions;

means for feeding centrifuging material into said inner space at a first one of said two end portions of said at least one at least approximately cylindrical sieve drum;

said at least one at least approximately cylindrical sieve drum having an inner side and an axial direction;

a solid material outlet provided at a second one of said two end portions of said at least one at least approximately cylindrical sieve drum;

at least one co-rotating pusher ring capable of performing an oscillating motion in said axial direction while transporting at least partially dewatered centrifuging material at said inner side in a direction toward said solid material outlet;

said at least one co-rotating pusher ring having an outer edge portion;

surface elements provided at said outer edge portion of said at least one co-rotating pusher ring;

said surface elements being oriented in inclined relationship to said axis of rotation of said at least one at least approximately cylindrical sieve drum;

said at least one at least approximately cylindrical sieve drum having a predetermined circumferential direction; and said surface elements imparting to the centrifuging material during said oscillating motion an additional motive component in said predetermined circumferential direction of said at least one at least approximately cylindrical sieve drum.

2. The pusher centrifuge as defined in claim 1, wherein:

said at least one at least approximately cylindrical sieve drum comprises an inner sieve drum and an outer sieve drum;

said inner sieve drum having an outer edge portion;

said at least one co-rotating pusher ring constituting said outer edge portion of said inner sieve drum;

said outer edge portion of said inner sieve drum being provided with said surface elements; and said inner sieve drum performing said oscillating motion relative to said outer sieve drum.

3. The pusher centrifuge as defined in claim 2, wherein:

said surface elements provided at said outer edge portion of said inner sieve drum form an angle between 30° and 60° relative to said axis of rotation.

4. The pusher centrifuge as defined in claim 2, wherein neighboring surface elements possess the same inclined orientation.

5. The pusher centrifuge as defined in claim 2, wherein:

neighboring surface elements are alternatingly inclined opposite to one another.

6. The pusher centrifuge as defined in claim 2, wherein:

said outer edge portion of said inner sieve drum comprises notches;

said notches having surfaces; and said surface elements constituting said surfaces of said notches of said outer edge portion of said inner sieve drum.

7. The pusher centrifuge as defined in claim 6, wherein:

said notches are structured by segments mounted at said outer edge portion of said inner drum; and said segments having inclined surfaces.

8. The pusher centrifuge as defined in claim 1, further including:

a pusher bottom;

said at least one at least approximately cylindrical sieve drum constituting a plurality of at least approximately cylindrical sieve drums;

said plurality of at least approximately cylindrical sieve drums comprising an innermost sieve drum;

said pusher bottom oscillating within said innermost sieve drum;

said pusher bottom having an outer edge portion;

surface elements provided at said outer edge portion of said pusher bottom; and said surface elements at said outer edge portion of such pusher bottom being inclinedly oriented.

9. The pusher centrifuge as defined in claim 8, wherein:

said surface elements at said outer edge portion of said at least one co-rotating pusher ring form an angle between 30° and 60° relative to said axis of rotation; and said surface elements at said outer edge portion of said pusher bottom form an angle between 30° and 60° relative to said axis of rotation.

10. The pusher centrifuge as defined in claim 8, wherein:

said plurality of at least approximately cylindrical sieve drums comprise an outer sieve drum and at least said innermost sieve drum;

said at least innermost sieve drum having an outer edge portion;

said at least one co-rotating pusher ring constituting said outer edge portion of said innermost drum; and said outer edge portion of said innermost drum being provided with said surface elements of said at least one co-rotating pusher ring.

* * * * *